UNITED STATES PATENT OFFICE.

JOHN B. McMUNN, OF PORT JERVIS, NEW YORK.

LUBRICATING COMPOUND.

Specification forming part of Letters Patent No. 26,693, dated January 3, 1860; Reissue No. 1,080, dated November 20, 1860.

*To all whom it may concern:*

Be it known that I, JOHN B. McMUNN, of Port Jervis, in the county of Orange and State of New York, have invented a new and Improved Lubricating Compound; and I do hereby declare that the following is a full, clear, and exact description of the same.

My invention consists in a composition obtained by uniting an alkaline base—such as potassa or soda—with oleine and stearine—the proximate acid principle of animal and vegetable oils, fats, and tallow—and with cerine—the acid principle of wax—in about the proportion hereinafter described, thereby producing a lubricator which, while it will economize power and prevent wearing, will not become gummy and glutinous, but keep the journals and other parts to which it may be applied cool and so as to be easily cleaned.

To enable others skilled in the art to fully understand it, I will proceed to describe it—first by giving a general idea of the principles involved in its manufacture, and afterward by describing an example of the manner of decomposing and preparing the original ingredients, and of combining them together with the alkali to form the composition.

In the process of manufacture the fatty substance and the wax are first decomposed by being dissolved in the alkaline solution, which, being a strong base, displaces and sets free the glycerine—the weaker natural base of oils, &c.—and the myricine—the natural base of wax—by the process of simple elective affinity. The result of this is that the alkali and the fatty and ceric acids combine with one another in such proportions, as they unite at a temperature of about 200° Fahrenheit and form a uniform saponaceous-like compound. After leaving this compound standing still awhile, it separates into two parts, one of which is watery liquid, known as "under-lye," and contains the separated basis of the oil or other fatty substances and some free alkali. This part subsides and leaves the other as a homogeneous slippery-feeling mass, consisting of the saline compounds of the alkali and the ceric and fatty acids in a state of thick solution with the myricine. As the under-lye is incompatible with the superincumbent mass, and will not readily unite with it without again separating, therefore it is rejected by being drained off, or otherwise got rid of. The residual composition is then susceptible of being mixed with both oil and water, using either of them first, and may be reduced to a thinner consistency with them, as, first, by the admixture of some oil to lessen the proportion of wax, accordingly as the compound may be wanted for light bearings and slow motion or for heavy bearings and a quick motion; and then by adding some soft water to combine the constituents and to thin it, so that it will pour and spread readily on the parts upon which it may be applied. During each mixture it should be thoroughly stirred.

The entire process will be rendered perfectly clear by the following example: I put into an iron kettle one gallon of whale-oil and heat it hot; and then I put into a small kettle five and a half ounces of beeswax and heat it till it is melted and fluid, and pour it into the kettle with the oil, and stir them well together until they are intimately mixed, which they will be in three or five minutes. Then I make a lye in a clean iron kettle by dissolving seven ounces of the carbonate of potassa in one gallon of soft boiling water, and render it caustic in the usual way by gradually adding to it, by spoonfuls, three and a half ounces of quicklime slaked to a fine powder, with water to decarbonate it, and after allowing the mixture to boil ten or fifteen minutes I close it from the air with a lid and set it to repose for the sediment to subside, after which I decant off the supernatant clear solution, and while at the temperature of between 180° and 200° Fahrenheit I pour it slowly into the other mixture, which should be of the same degree of heat, and stir them well together thoroughly for eight or ten minutes. After that I pour the whole mass out into a tub and continue to stir it uniformly till it is quite cold, to keep the ingredients together, to favor the decomposition of the oil and beeswax, and also the displacement of their natural bases and the union of their acids with the alkali. Then I set it aside and leave it undisturbed for ten or twelve days. At the expiration of that time I tap the tub at the bottom with a gimlet and drain off the under-lye that may be collected there; after that is done I stop the hole with a spile and stir the composition well, while pouring into it about three gills of soft water to thin it. And after leaving it in repose for eight or ten days longer, what under-lye may be collected again I drain off also, and stir the mass in like manner as before, to which I then add two and a half or three gallons of whale-oil, and after they are thoroughly mixed I add soft water enough to make the compound of the consistency required for practical use. Now, after all these operations have been carefully and skillfully performed with pure and genuine ingredients, the constituents will all be combined and remain so, and the composition is ready to be applied and used for all the purposes of lubrication.

Having thus fully described my invention, what I claim as new, and desire to secure by Letters Patent, is—

The compound made of the herein-named ingredients by combining them together substantially in the manner and in about the proportions herein set forth.

JOHN B. McMUNN.

Witnesses:

C. A. LEWIS,

GEORGE BRODHEAD.